United States Patent
Baek et al.

(10) Patent No.: US 11,666,896 B2
(45) Date of Patent: Jun. 6, 2023

(54) CATALYST COMPOSITION WITH IMPROVED CHEMICAL WARFARE AGENT DEGRADATION ABILITY AND PROCESSABILITY

(71) Applicant: KOREA INSTITUTE OF SCIENCE AND TECHNOLOGY, Seoul (KR)

(72) Inventors: Kyung Youl Baek, Seoul (KR); Soon Man Hong, Seoul (KR); Seung Sang Hwang, Seoul (KR); Chong Min Koo, Seoul (KR); Seon Joon Kim, Seoul (KR); Albert Lee, Seoul (KR); Jin Young Seo, Seoul (KR); Min Hyuk Choi, Seoul (KR); Yu Ri Lee, Seoul (KR); Sejin Kim, Seoul (KR); Do Xuan Huy, Seoul (KR); Que Thi Nguyen, Seoul (KR); Sangho Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 59 days.

(21) Appl. No.: 17/162,639

(22) Filed: Jan. 29, 2021

(65) Prior Publication Data
US 2021/0362142 A1 Nov. 25, 2021

(30) Foreign Application Priority Data
Jan. 29, 2020 (KR) .......................... 10-2020-0010593

(51) Int. Cl.
| | | |
|---|---|---|
| B01J 31/06 | (2006.01) | |
| B01J 31/16 | (2006.01) | |
| A62D 3/35 | (2007.01) | |
| B01J 35/00 | (2006.01) | |
| B01J 37/02 | (2006.01) | |
| B01J 37/34 | (2006.01) | |

(52) U.S. Cl.
CPC ............ *B01J 31/1691* (2013.01); *A62D 3/35* (2013.01); *B01J 31/06* (2013.01); *B01J 35/0006* (2013.01); *B01J 37/0215* (2013.01); *B01J 37/343* (2013.01)

(58) Field of Classification Search
None
See application file for complete search history.

(56) References Cited

FOREIGN PATENT DOCUMENTS

WO 2019/194783 A2 10/2019

OTHER PUBLICATIONS

Craig Wilson, "Porous materials for protection against Chemical Warfare Agents (CWAs)," Thesis for PhD, University of Liverpool, Jun. 2019, 289 pages.
Korean Office Action for Application No. 10-2020-0010593 dated May 7, 2021, In conformance with MPEP 609—Concise explanation of the relevance includes issue date of KR OA and references cited therein.

*Primary Examiner* — Yun Qian
(74) *Attorney, Agent, or Firm* — Cantor Colburn LLP

(57) ABSTRACT

Provided are a catalyst composition with improved processability and chemical warfare agent degradation ability, a film composite manufactured by casting the same, and a preparation method thereof. Specifically, provided are a catalyst composition including a copolymer of a first polymer and a second polymer; and a metal-organic framework (MOF), and a film composite including the same, wherein processability and catalytic activity are improved.

13 Claims, 15 Drawing Sheets
(14 of 15 Drawing Sheet(s) Filed in Color)

CATALYST COMPOSITION WITH IMPROVED CHEMICAL WARFARE AGENT DEGRADATION ABILITY AND PROCESSABILITY

TECHNICAL FIELD

The present invention relates to a catalyst composition with improved processability and chemical warfare agent degradation ability, a film composite manufactured by casting the same, and a preparation method thereof.

BACKGROUND ART

Although use of chemical warfare agents (CWAs) has been strictly prohibited under the Chemical Weapons Convention, it threatens humanity. Among the various types of CWAs, organophosphate, known as a nerve agent, has been most widely used in civil wars and chemical terrorism. Although major threats, including assassination, still exist in Syria, Malaysia, and the UK in recent years, defenses against CWAs still rely on physical protection using adsorption and semi-permeable coatings. These physical protection methods have several problems of persistent toxicity, need for secondary treatment, and lack of capacity. Therefore, it is necessary to develop a new kind of protective material capable of immediately removing toxicity.

Chemical protection methods against CWAs by catalytic reactions are considered as potential protective material candidates. Many active substances have been developed for chemical degradation of CWAs, such as metal oxides, organophosphate hydrolase (OPH), ionic polymers, and metal-organic frameworks (MOFs), but there is a problem in that it is difficult to apply catalysts to protective fabrics due to insufficient reactivity and stability. Meanwhile, zirconium (Zr(IV))- and cerium (Ce(IV))-based metal-organic frameworks (MOFs), such as UiO-66, MOF-808, and Ce-BDC, have exhibited excellent catalytic activity and water stability due to isolated Lewis acid catalytic metal sites. However, despite their tremendous catalytic activity and stability, MOFs cannot be applied for protective applications due to their low processability and need for a liquid cocatalyst (e.g., N-ethylmorpholine).

Many studies have been conducted to integrate MOFs with flexible, processable polymers and to apply them as chemical-protective fibers. However, the previously reported MOF-polymer mixed matrix composites exhibited only physical protection by a thick polymer layer acting as a matrix despite the presence of chemically active MOFs. According to another study, nanofiber composites containing MOFs are able to degrade nerve agents in a buffered solution, but there is a problem of showing much lower activity than MOF powder, due to encapsulated pores of the MOFs. As another approach, several types of solid subcatalysts capable of improving the catalytic activity of Zr(IV)-based MOFs have been developed in order to replace the existing volatile liquid subcatalysts (e.g., N-ethylmorpholine). Linear polyethylenimine (LPEI), branched polyethylenimine (BPEI), and PAMAM dendrimers have been developed to replace N-ethylmorpholine. However, there is a problem in that the auxiliary catalyst still cannot be treated to fibers due to insufficient processability. Accordingly, there is a demand for the development of a chemical-protective fabric having excellent chemical warfare agent degradation ability and high processability.

In view of this technical background, the present inventors have made intensive efforts to improve chemical warfare agent degradation ability and processability. As a result, they found that the problems of the prior art may be solved by copolymerizing a solid cocatalyst branched polyethylenimine with a polymer and mixing the copolymer with a metal-organic framework, and that it may be processed as a film composite, thereby completing the present invention.

DISCLOSURE

Technical Problem

An object of the present invention is to provide a catalyst composition with improved processability and chemical warfare agent degradation ability.

Another object of the present invention is to provide a film composite manufactured by using improved processability of the catalyst composition.

Still another object of the present invention is to provide a method of preparing the catalyst composition with improved processability and chemical warfare agent degradation ability by mixing a copolymer including a second polymer with a metal-organic framework.

Still another object of the present invention is to provide a method of manufacturing a film composite by casting the catalyst composition.

Technical Solution

A first aspect of the present invention provides a catalyst composition including a copolymer of a first polymer and a second polymer; and a metal-organic framework (MOF), wherein the metal-organic framework has chemical warfare agent degradation ability, and the chemical warfare agent degradation ability includes liquid- or gas-phase detoxification.

As used herein, the "metal-organic framework" may refer to a metal-organic framework for chemical degradation of chemical warfare agents (CWAs). Specifically, it may be a zirconium (Zr(IV))- and cerium (Ce(IV))-based metal-organic framework (MOF). More specifically, it may be a zirconium (Zr) metal-organic framework selected from the group consisting of UiO-66, UiO-67, PCN-545, and NU-1000. In one exemplary embodiment of the present invention, provided is a catalyst composition including UiO-66.

The chemical warfare agent which may be eliminated by the composite catalyst of the present invention may be an organophosphate-based nerve agent, such as sarin, soman, cyclosarin, VX, etc., of which toxicity may be remarkably reduced by hydrolysis, but is not limited thereto.

However, in spite of the catalytic activity and stability, there is a problem in that application of a MOF to a protective fabric is difficult due to low processability and need for a liquid cocatalyst (e.g., N-ethylmorpholine). Accordingly, in the present invention, the above problem may be solved by adding the copolymer of the first polymer and the second polymer.

Further, the "metal-organic framework" may be 0.01 wt % to 40 wt % with respect to the total weight of the catalyst composition. As wt % of the metal-organic framework is increased, the chemical warfare agent degradation ability may be improved. However, if the metal-organic framework exceeds 40 wt %, there is a problem in that processing into a film composite is impossible due to brittleness of metal-organic framework catalysts.

As used herein, the "copolymer of the first polymer and the second polymer" is a compound needed to improve moisture resistance and processability, and the MOF and the copolymer of the present invention are treated by a solution process to provide the catalyst composition and a film composite of the present invention.

The "second polymer" is a basic polymeric cocatalyst, and is a solid sub-cocatalyst capable of interacting with a chemical warfare agent. However, when only the second polymer is used, there are problems of low moisture resistance and insufficient film properties due to strong hydrogen bonds in the molecule. To solve this problem, the second polymer is allowed to form the copolymer, together with the first polymer. Accordingly, it is possible to provide the catalyst composition having processability, of which moisture resistance and film properties are improved. Specifically, the second polymer may be a polymer having a primary to tertiary amine functional group or a polymer having a cyclic amine functional group, but is not limited thereto. More specifically, the polymer having a primary to tertiary amine functional group may be branched polyethylenimine (BPEI) or linear polyethylenimine (LPEI), but is not limited thereto.

The "first polymer" may be a fiber composite that allows the catalyst composition of the present invention to have processability, and specifically, the first polymer may include at least one selected from the group consisting of polyamide, polyurethane, polyolefin, polyester, polyacrylonitrile, polystyrene, polyvinyl alcohol, polyethylene oxide, polycaprolactam, polyvinylidene fluoride, and acrylic polymers, but is not limited thereto. More specifically, the first polymer may include the acrylic polymer. The acrylic polymer may be an alkyl (meth)acrylate polymer. The alkyl may be any one selected from the group consisting of methyl, ethyl, and propyl. In one exemplary embodiment of the present invention, PMMA (polymethyl methacrylate) is used to provide the catalyst composition and film composite.

As used herein, the "copolymer" may be a copolymer in which a molar ratio of first polymer:second polymer is 1:0.5 to 1:2. When the molar ratio of the second polymer is less than 0.5, there is a problem in that its role as the cocatalyst may be ineffective. When its molar ratio is more than 2, there is a problem in that it is impossible to manufacture a film composite using the finally prepared catalyst composition.

Further, a molecular weight of the "copolymer" may be 13000 to 30000. The molecular weight may refer to a molecular weight of the copolymer having the above molar ratio. The molecular weight may mean representing the minimum and maximum molecular weights within the range of the molar ratio of the first polymer and the second polymer constituting the copolymer. The molecular weights of the copolymers prepared in one exemplary embodiment of the present invention were calculated as about 13700, about 17600, and about 28500.

The half-life of the "catalyst composition" of the present invention for hydrolysis of chemical warfare agents (CWAs) may be about 0.7 hours to about 2.5 hours. The half-life may be derived from the results of evaluating the activity of the final catalyst composition of the present invention by a model reaction using hydrolysis of methyl paraoxon (MPO), which is a kind of nerve agent simulant. The hydrolysis of MPO was consistent with the pseudo-first-order kinetics, and the half-life $t_{1/2}$ was calculated by the pseudo-first-order kinetic equation $(\ln(C_t/C_o)=-kt)$. As a result, the above range of the half-life time was obtained.

A second aspect of the present invention provides a film composite manufactured by casting the catalyst composition including the copolymer of the first polymer and the second polymer; and the metal-organic framework (MOF), wherein the catalyst composition has chemical warfare agent (CWA) degradation ability.

In the known processed composites, to which a MOF having chemical warfare agent degradation ability is applied, a thick polymer layer acting as a matrix reduces porosity of the MOF and the diffusion rate of the chemical warfare agent, and thus there is a problem in that only physical protection is possible despite the high chemical activity of the MOF. However, it was confirmed in one exemplary embodiment of the present invention that the "film composite" of the present invention may function as a chemical-protective fabric capable of chemical protection by increasing processability due to the copolymer of the first polymer and the second polymer and by improving chemical warfare agent degradation ability of a MOF, thereby completing the present invention.

The thickness of the "film composite" may be 20 μm to 500 μm. The numerical range of the thickness may mean that the film composite may have the maximum hydrolytic activity against chemical warfare agents while having flexibility. When the thickness of the film composite is less than 20 μm, there is a problem in that the chemical warfare agent degradation ability may be remarkably reduced, and when the thickness of the film composite is more than 500 μm, there is a problem in that the flexibility, which is a physical property of the film composite, becomes poor.

The film composite may refer to a film composite manufactured on at least one support selected from the group consisting of a metal substrate, a cotton fabric, a polymer film, and a porous resin, ceramic plate, glass plate, silica substrate, clay products, but is not limited thereto.

A third aspect of the present invention provides a method of preparing the catalyst composition, the method including a first step of coupling 2-(dodecylthiocarbonothioylthio)-2-methylpropionic acid (CTA) and N-hydroxysuccinimide (NHS) to synthesize a chain transfer agent; a second step of functionalizing the first polymer with the chain transfer agent; a third step of performing an amide or ester coupling reaction of the second polymer and the functionalized first polymer prepared in the second step to synthesize the copolymer; and a fourth step of mixing the prepared copolymer and the metal-organic framework.

The second step may be to functionalize by a reversible addition fragmentation chain transfer (RAFT) reaction.

A fourth aspect of the present invention provides a method of manufacturing the film composite, the method including a first step of preparing a mixture by sonication of the catalyst composition of the first aspect; a second step of injecting the mixture into a mold for casting; and a third step of drying at 30° C. to 50° C. for 12 hours. The method of manufacturing the film composite according to one exemplary embodiment of the present invention is illustrated in FIG. 9.

The method may further include at least one coating step selected from the group consisting of spray coating, dip coating, spin coating, and blade coating, after the third step, but is not limited thereto.

Advantageous Effects

The present invention confirmed that when a copolymer of a first polymer and a second polymer is mixed with a metal-organic framework having chemical warfare agent degradation ability, the catalytic activity was improved while having excellent processability. Accordingly, it has excellent applicability to chemical protection fabrics against chemical warfare agents, thereby allowing it to be widely used in the fields of military technologies, etc.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
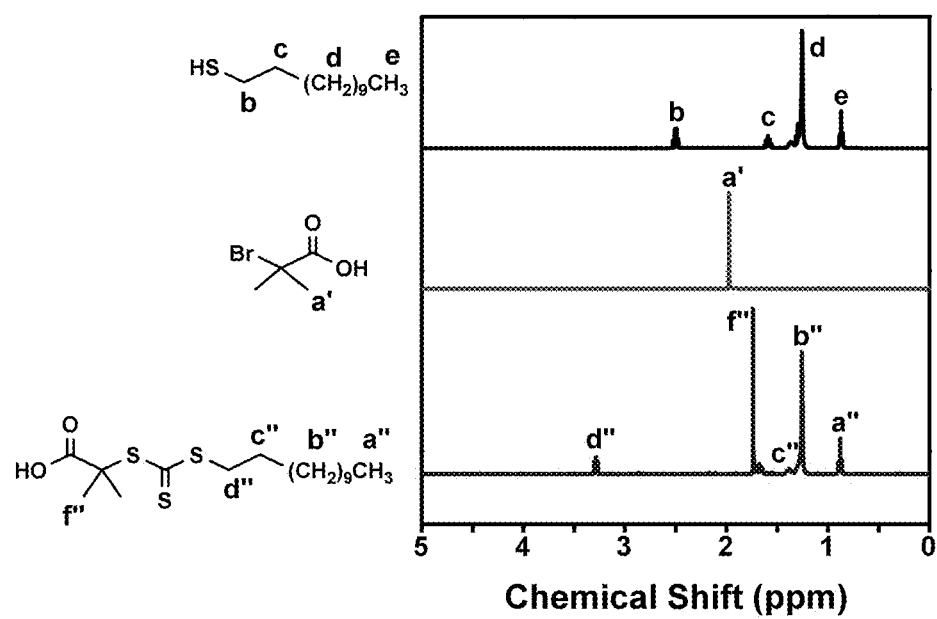
FIG. 1 shows a $^1$H NMR spectrum of synthesized 2-(dodecylthiocarbonothioylthio)-2-methylpropionic acid (CTA)

Hereinafter, the present invention will be described in more detail with reference to Examples. However, these Examples are for illustrative purposes only, and the scope of the present invention is not intended to be limited by these Examples.

<Materials>

Zirconium(IV) chloride (≥99.5%), 1,4-benzene dicarboxylic acid (BDC, 98%), methyl paraoxon (MPO), sodium borohydride (NaBH$_4$, 98%), N-hydroxysuccinimide (NHS, 98%), 1-dodecane thiol (98%), carbon disulfide (CS$_2$, 99%), 2-bromoisobutyric acid (97%), potassium phosphate (K$_3$PO$_4$, 98%), N,N-dicyclohexylcarbodiimide (DCC, 99%), and branched poly(ethylene imine) (BPEI, M$_n$=10, 000) were purchased from Sigma-Aldrich and used without further treatment. Methyl methacrylate (MMA, 99%) was purchased from Sigma-Aldrich, and in order to remove inhibitors, it was passed through an alumina oxide column before use. Ethanol, methanol, dimethylformamide (DMF), hydrochloric acid (HCl, 35%), toluene, acetone, dichloromethane, ethyl acetate (EA), chloroform, and n-hexane were purchased from Daejung Chemicals and used without further treatment. Deionized water (Milli-Q Millipore 18.2 MΩ·cm$^{-1}$) was used in all experiments.

Synthesized compounds and copolymers were analyzed by $^1$H nuclear magnetic resonance spectroscopy at 300 K (Bruker Avance III 400 MHz FT NMR spectrometer). PMMA-NHS was analyzed using a JASCO PU-2080 plus SEC system equipped with KF-802, KF-803, KF-804, and KF-805 columns, and an RI-2031 detector and a UV-2057 detector (254 nm) using THF. A mobile phase was used at 40° C. and at a flow rate of 1 mL·min$^{-1}$. A number average molecular weight (M$_n$), a weight average molecular weight (M$_w$), and a polydispersity index (PDI, M$_w$/M$_n$) of PMMA-NHS were calculated based on calibration using PMMA standards. Thermal analysis was performed by thermogravimetric analysis (TGA, TA instrument TGA Q-50) and differential scanning calorimetry (DSC, TA instrument Q20) under nitrogen. The surface morphology was measured by a scanning electron microscope (FE-SEM; FEI Inspect F50) with an acceleration voltage of 10 kV. The prepared composites and copolymers were analyzed by Fourier-modified infrared spectroscopy (FT-IR, Nicolet iS10. Thermo Scientific) and X-ray photoelectron spectroscopy (XPS, PHI 5000 VersaProbe, Physical electronics Inc.) to examine changes in functional groups. The crystal structure was examined by X-ray diffraction (XRD, D8 Advance, Sol-X) using Cu Kα radiation (λ=1.54 Å) at 40 kV and 40 mA. The surface zeta potentials of the prepared polymers were measured using a zeta potential analyzer (ELSZ-1000, Otsuka electronics).

Example 1. Preparation of Copolymer of First Polymer PMMA and Second Polymer Branched Polyethylenimine (BPEI)

1.1 Synthesis of Chain Transfer Agent (CNT-NHS)

2-(Dodecylthiocarbonothioylthio)-2-methylpropionic acid (CTA) was synthesized as follows. Potassium phosphate tribasic (K$_3$PO$_4$, about 9.84 g, about 46.3 mmol), carbon disulfide (CS$_2$, about 7.6 mL, about 126.7 mmol), and 1-dodecane thiol (about 11.1 mL, about 46.3 mmol) were put into a 500 mL round-bottom flask and dissolved in about 50 mL of acetone. In another vial, 2-bromoisobutyric acid (about 7 g, about 42.1 mmol) was dissolved in about 35 mL of acetone, and these two solutions were mixed and stirred at room temperature for 12 hours or longer. After reaction, acetone was evaporated with a rotary evaporator, and the resultant was dissolved in about 500 mL of DCM.

This solution was extracted with about 1 M HCl (2×150 mL) and brine (2×150 mL). After extraction, the organic layer was treated with MgSO$_4$, and the product was purified by silica gel column chromatography using EA/n-hexane (approximately 3:7). As a result, about 12.2 g of CTA was obtained, and the yield was about 80%.

As shown in FIG. 1, it could be confirmed through a $^1$H NMR spectrum that CTA was synthesized.

Figure 2:
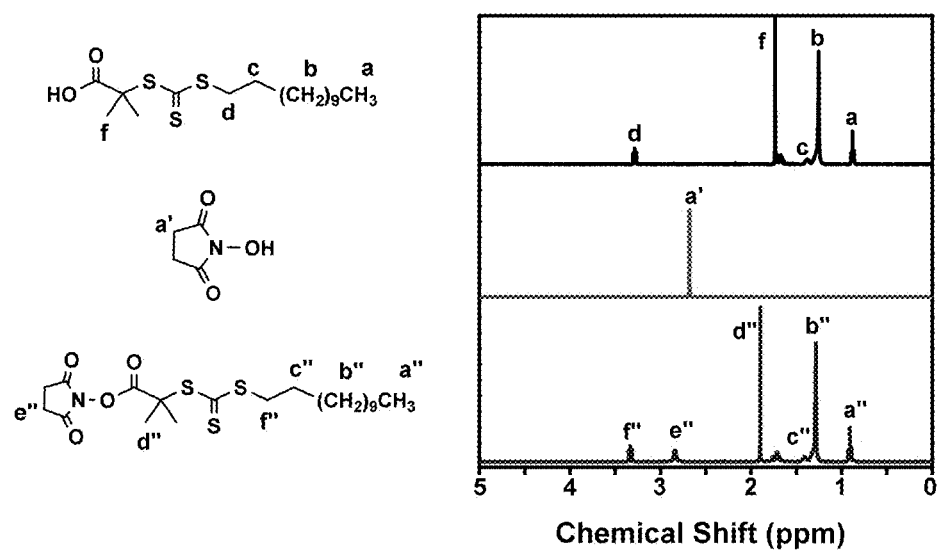
FIG. 2 shows a $^1$H NMR spectrum of synthesized 2-(dodecylthiocarbonothioylthio)-2-methylpropionic acid-N-hydroxysuccinimide ester (CTA-NHS)

For synthesis of dodecylthiocarbonothioylthio-2-methylpropionic acid N-hydroxysuccinimide ester (CTA-NHS), about 5 g of CTA (about 13.75 mmol) and about 1.9 g of N-hydroxysuccinimide (about 16.5 mmol) were dissolved in about 400 mL of DCM in a 1000 mL round-bottom flask. In another vial, about 3.55 g of DCC was dissolved in about 100 mL of DCM. Then, the DCC solution was added dropwise and transferred to the CTA solution with stirring at room temperature (RT) for 24 hours. After a predetermined time, the reaction solution was concentrated using a rotary evaporator, extracted with brine (3×150 mL), and the organic layer was treated with MgSO$_4$. The resulting product was purified by column chromatography using EA/n-hexane (approximately 4:6) ($^1$H NMR of CTA-NHS is shown in FIG. 2). About 4.89 g of the product CTA-NHS was obtained, and the yield was about 77%.

As shown in FIG. 2, it could be confirmed through a $^1$H NMR spectrum that CTA-NHS was synthesized.

1.2 Synthesis of Chain Transfer Agent-Functionalized First Polymer (PMMA-NHS)

About 0.43 g of the synthesized CTA-NHS (0.935 mmol) and about 15.3 mg of AIBN (0.0935 mmol) were loaded in a 250 mL round-bottom flask, and dissolved in about 60 mL of toluene. About 10 mL of MMA (93.5 mmol) was added to the solution, and the reaction mixture was degassed for 1 hour by Ar bubbling. Thereafter, the reaction solution was maintained at about 70° C., and the reaction was allowed for about 48 hours. After 2 days, the reaction mixture was diluted with toluene and precipitated with methanol. A desired yellow polymer was collected using a centrifuge and dried at about 70° C. for 12 hours or longer under vacuum. As a result, about 9.2 g of PMMA-NHS was obtained, and the yield was about 92%.

Figure 3:
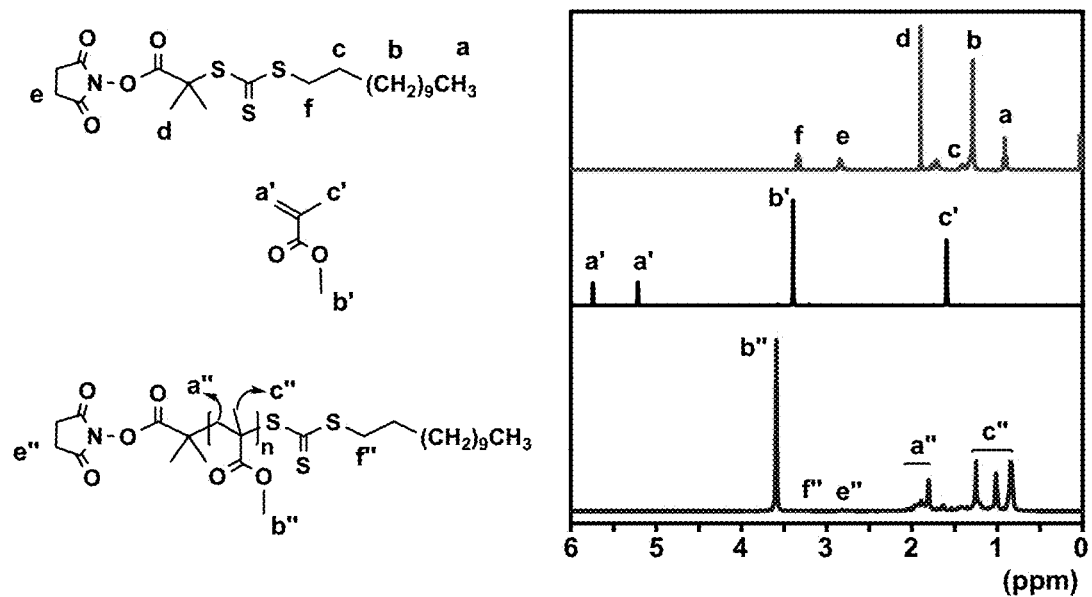
FIG. 3 shows a $^1$H NMR spectrum of synthesized polymethylmethacrylate-N-hydroxysuccinimide ester (PMMA-NHS)

As shown in FIG. 3, it could be confirmed through a $^1$H NMR spectrum that PMMA-NHS was synthesized.

1.3 Preparation of Copolymer (PMMA-BPEI) of First Polymer and Second Polymer (Branched Polyethylenimine)

Figure 4:
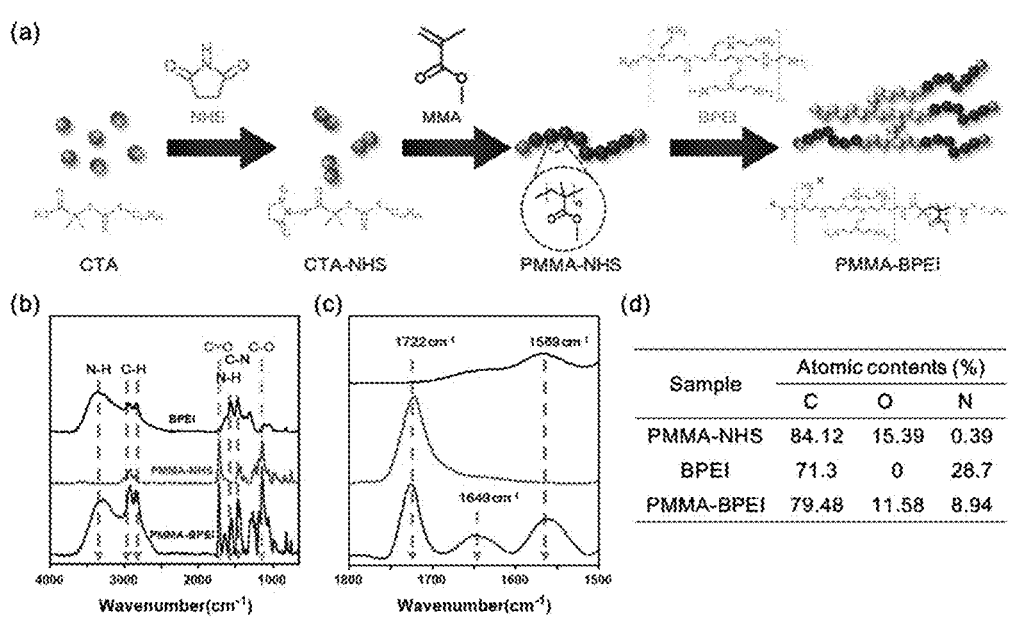
In FIG. 4, (A) shows an illustration of a synthesis process of synthesized polymethylmethacrylate-branched polyethylenimine (PMMA-BPEI) copolymer, (B) and (C) show FT-IR spectra of BPEI, PMMA-NHS, and PMMA-BPEI, and (D) shows a graph showing atomic contents analyzed by XPS.

FIG. 4 shows a schematic illustration of a synthesis process of a PMMA-BPEI copolymer. About 1 g of BPEI (M$_n$; number average molecular weight: about 10 k, about 0.1 mmol) and about 1 g of PMMA-NHS (M$_n$: about 10 k, 0.1 mmol) were separately dissolved in 30 mL of chloroform. After dissolving, the two solutions were mixed, and allowed to react at about 25° C. for 48 hours. After a predetermined time, the reaction mixture was precipitated in n-hexane, and solids were collected using a centrifuge. The solids were dissolved in chloroform and stored in a solution state. Detailed synthesis conditions for different fractions (molar ratios) of PMMA-BPEI are shown in Table 1 below.

TABLE 1

| Experimental group | Sample | BPEI (g) | PMMA-NHS (g) | CHCl$_3$ (mL) |
|---|---|---|---|---|
| 1 | BPEI | 3 | | |
| 2 | PMMA-BPEI 1:2 | 1 | 2 | 45 |
| 3 | PMMA-BPEI 1:1 | 1.5 | 1.5 | 45 |
| 4 | PMMA-BPEI 2:1 | 2 | 1 | 45 |
| 5 | PMMA | — | 3 | 45 |

Table 1 shows detailed quantitative information for the synthesis of PMMA-BPEIs having different BPEI fractions.

As shown in (B) to (D) of FIG. 4, FT-IR spectrum and XPS (X-ray photoelectron spectroscopy) scanning showed synthesis of BPEI, PMMA-NHS, and PMMA-BPEI, and atomic contents.

Preparation Example 1. Preparation of UiO-66

Two solutions of one solution containing ZnCl$_4$ (about 1.62 mmol, about 0.38 g), about ⅓ DMF, and HCl (1.5 mL) and the other solution containing BDC (about 2.25 mmol, about 0.37 g) and DMF as the remainder were separately prepared, and stirred at about 50° C. until completely dissolved. At this time, the volume of DMF was about 11.25 mL. The former solution, i.e., the solution containing ZrCl$_4$, was poured into the latter solution. i.e., the BDC solution, and heated to about 80° C. and maintained for 24 hours to allow a reaction. After diluting with the same volume of DMF as used in the reaction, the precipitate was filtered and washed successively with an excess amount of DMF and ethanol. The obtained UiO-66 was dried overnight at about 90° C. and activated by drying at about 150° C. for 3 hours before use as a catalyst.

Experimental Example 1. Quantitative Analysis of Copolymer and Evaluation of Amide Coupling Reaction Through the $^1$H NMR spectrum of (A) of FIG. 5 and the XPS (X-ray photoelectron spectroscopy) N1s scanning results of (B) and (C) of FIG. 5, the PMMA-BPEI copolymer prepared in Example 1.3 could be quantitatively analyzed.

Figure 5:
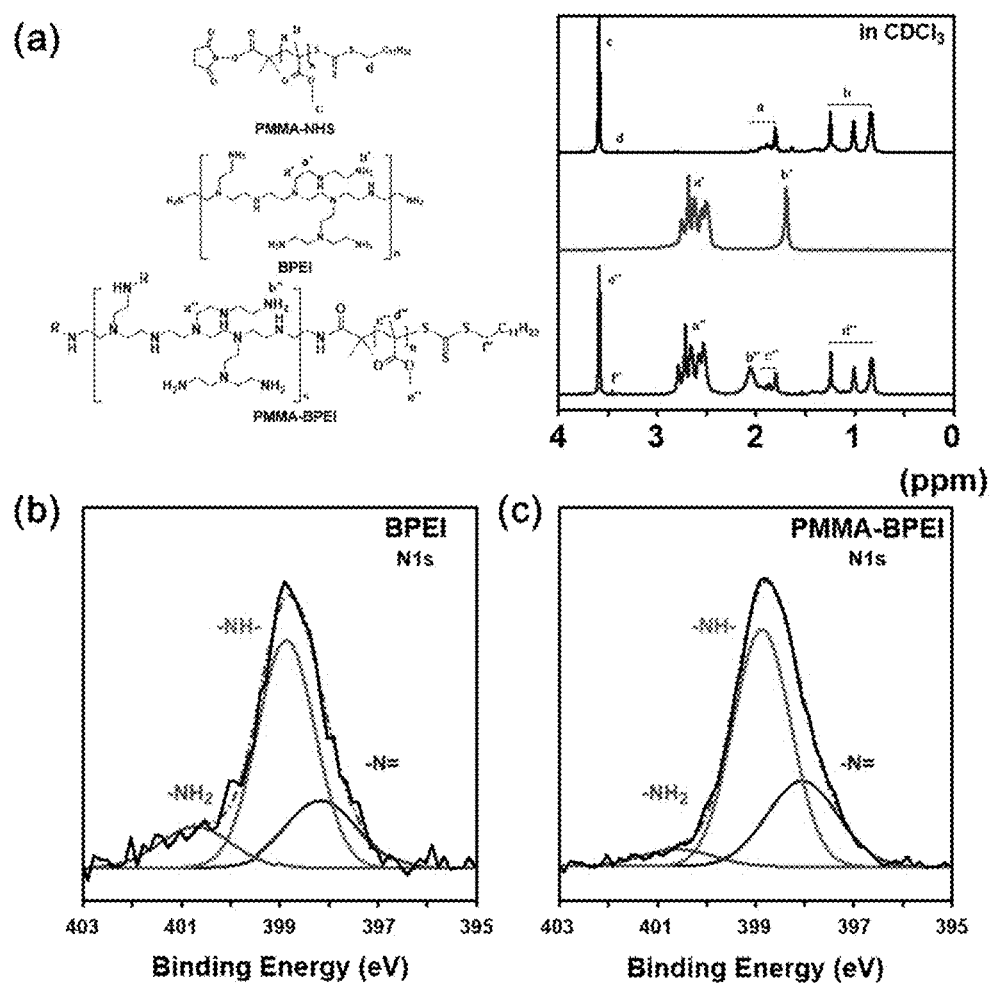
In FIG. 5, (A) shows $^1$H NMR spectra of PMMA-NHS, BPEI, and PMMA-BPEI, and (B) and (C) show XPS N1s spectra of BPEI and PMMA-BPEI, respectively.

In the $^1$H NMR spectrum of (A) of FIG. 5, alpha-methyl, beta-proton, and methyl groups on the acrylate of PMMA-NHS appeared at 1.3 ppm to 0.9 ppm, 1.7 ppm to 2.0 ppm, and 3.58 ppm, respectively. The alkyl chains of CTA-NHS appeared at 3.4 ppm and 0.5 ppm to 1.3 ppm. By comparing an integral ratio of the alpha-methyl group of PMMA and the alkyl chain of CTA-NHS, an ideal molecular weight of PMMA-NHS was calculated as 9800 Da. In the $^1$H NMR spectrum of BPEI, an amine group and an alkyl group appeared at 1.7 ppm and 2.3 ppm to 2.8 ppm, respectively. PMMA-BPEI showed a combined $^1$H NMR spectrum of PMMA-NHS and BPEI. In particular, the amine peak shifted from 1.7 ppm to 2.05 ppm. This is because the electron density of protons in the amine is lower than that of BPEI.

As shown in FIGS. 5B and 5C, XPS analysis was performed in order to compare the ratios of primary, secondary, and tertiary amines in PMMA-BPEI. BPEI showed three peaks corresponding to the primary, secondary, and tertiary amine groups in the XPS N1s spectrum (400.782 eV, 398.907 eV, and 398.157 eV). By comparing the integral ratio of each peak, BPEI was calculated to have about 13.9% primary amines, about 63.1% secondary amines, and about 23.0% tertiary amines. In (C) of FIG. 5, PMMA-BPEI shows three peaks in the XPS N1s spectrum (400.657 eV, 399.005 eV, and 398.032 eV), but the relative intensity was different from the XPS spectrum of BPEI of (B) of FIG. 5. As compared with BPEI, the intensity of the primary amine peak (400.657 eV) slightly decreased, and the intensity of the tertiary amine peak (398.032 eV) increased. The amine ratio of PMMA-BPEI was calculated as about 5.8% primary amines, about 65.2% secondary amines, and about 29.0% tertiary amines. These results confirmed that the primary amines were converted to the tertiary amines by the amide coupling reaction.

Figure 6:
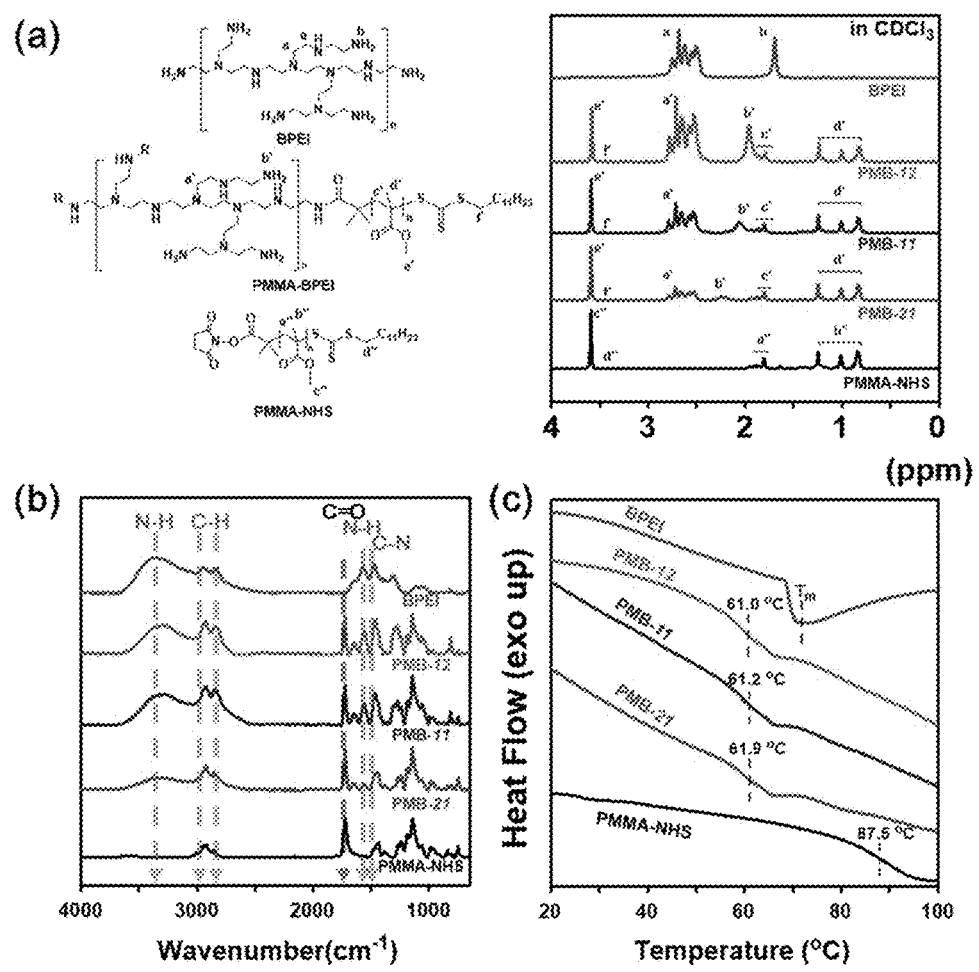
In FIG. 6, (A) shows $^1$H NMR spectra of PMMA-NHS, BPEI, and PMMA-BPEIs having different fractions, (B) shows FT-IR spectra thereof, and (C) shows differential scanning calorimetry (DSC) thermogram under nitrogen ($N_2$)

Experimental Example 2. Evaluation of Synthesis of Copolymer of PMMA-BPEI with Controlled BPEI Fraction As shown in FIG. 6, various PMMA-BPEI copolymers having different BPEI contents were synthesized and analyzed. A PMMA-BPEI copolymer having a molar ratio (x:y) of PMMA and BPEI was expressed as PMB-xy. For example, PMB-11 means that a PMMA-BPEI copolymer includes PMMA and BPEI at a molar ratio of 1:1. A fraction containing BPEI in the PMMA-BPEI copolymer may be verified by $^1$H NMR ((A) of FIG. 6). The BPEI fraction of the copolymer may be determined by comparing the integral ratio of the methyl group (3.5 ppm) on the acrylate of PMMA-NHS and the alkyl group (2.5 ppm) on the BPEI. In $^1$H NMR, as the BPEI fraction increased, the intensity (2.5 ppm) of the alkyl group on the BPEI increased. The BPEI fractions of PMB-12, PMB-11, and PMB-21 were calculated as 73.3%, 57.2%, and 35.6%, based on PMMA, respectively. The molecular weights of PMB-12, PMB-11, and PMB-21 were about 13700, about 17600, and about 28500, respectively. A method of calculating the BPEI fraction and the molecular weight is as follows:

$$M_{n,PMMA\text{-}BPEI} = M_{n,PMMA\text{-}NHS} * x_{PMMA\text{-}NHS} + M_{n,BPEI} * x_{BPEI} + M_{n,CTA\text{-}NHS} * x_{CTA\text{-}NHS} \quad \text{(Equation 1)}$$

The BPEI fraction and molecular weight in the PMMA-BPEI copolymer were calculated using a $^1$H NMR spectrum. The BPEI fraction was calculated by comparing the integral ratio between the alkyl group (2.5 ppm) on BPEI and the methyl group on the acrylate of PMMA (3.5 ppm).

For example, the integral ratio between the alkyl group (2.5 ppm) on BPEI and the methyl group on the acrylate of PMMA (3.5 ppm) was 4:3, and the molar ratio of BPEI and PMMA was calculated as 50%, considering the number of protons. In addition, the number average molecular weight was calculated using the integral ratio. The molecular weight was calculated by the integral ratio between the alpha-proton (f″ in FIG. 2) on CTA-NHS, the alkyl group (2.5 ppm) on BPEI, and the methyl group of PMMA (3.5 ppm) on acrylate. For example, if the integral ratio between the alpha-proton on CTA-NHS, the alkyl group (2.5 ppm) on BPEI, and the methyl group (3.5 ppm) on the acrylate of PMMA is 2:513:300, the molar ratio considering the number of protons showed 1.77:1:1.77 of CTA-NHS, BPEI ($M_n$ 10,000), and PMMA ($M_n$ 10,000). Accordingly, the molecular weight of PMMA-BPEI was calculated as follows by applying Equation 1:

$$M_{n,PMMA\text{-}BPEI} = 10000*1.77 + 10000*1 + 461*1.77 = 28500$$

Figure 7:
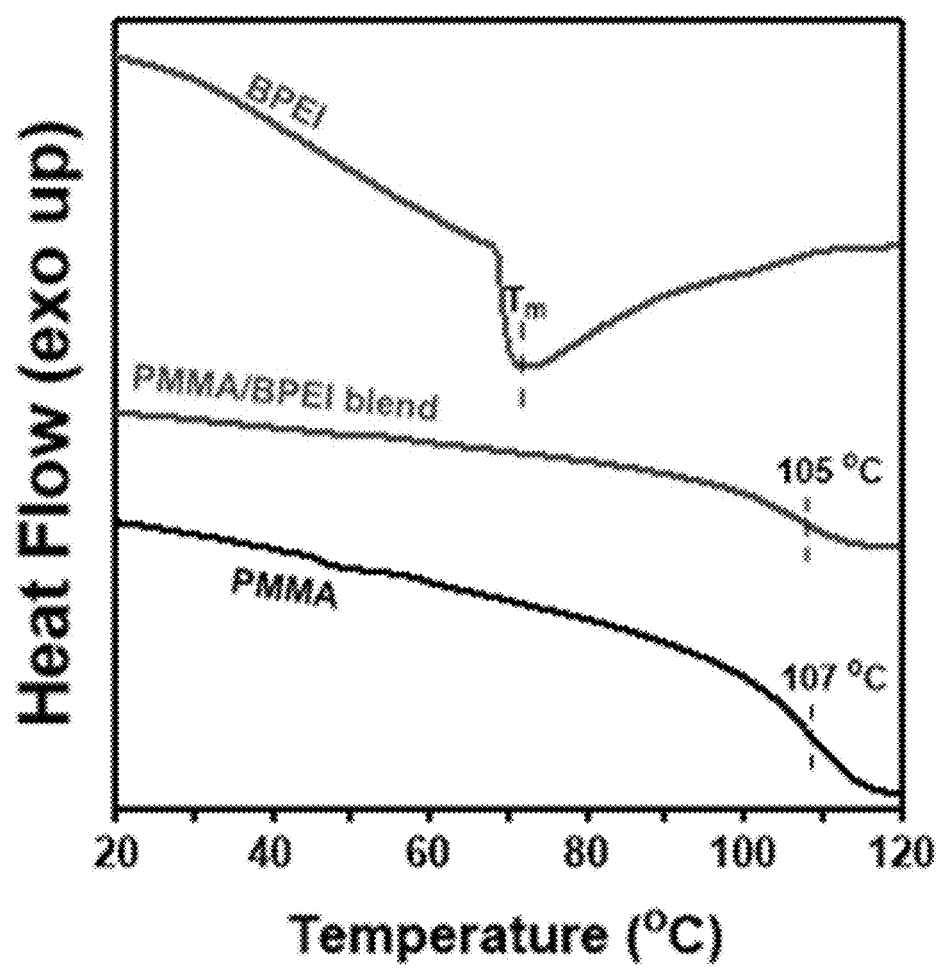
FIG. 7 shows a DSC spectrum of a sample of a physical mixture of BPEI, PMMA and BPEI, PMMA.
Figure 8:
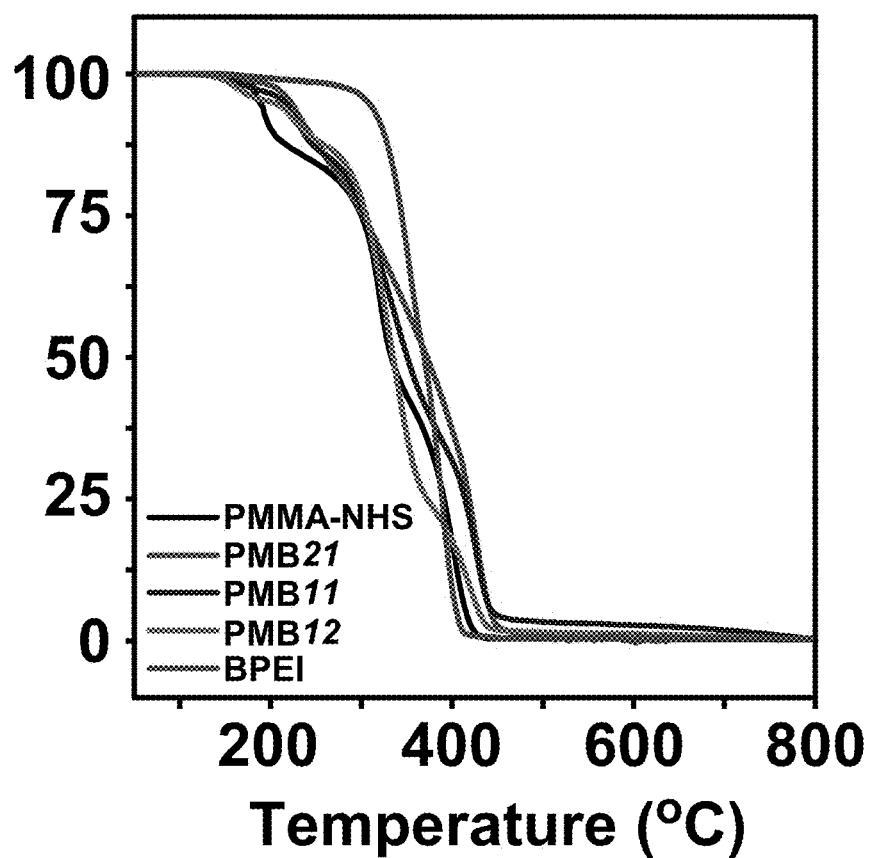
FIG. 8 shows a thermogravimetric analysis (TGA) spectrum of synthesized PMMA-BPEI having different BPEI fractions under nitrogen ($N_2$)

In the FT-IR spectrum of (B) of FIG. 6, the PMMA-BPEI copolymers having various BPEI fractions showed similar peak patterns without any particular peak appearance. However, in the $^1$H NMR spectrum of (A) of FIG. 6, as the BPEI fraction increased. PMMA-BPEI showed a higher peak in 3364 cm$^{-1}$ (NH stretching), 1569 cm$^{-1}$ (NH bending), and 1477 cm$^{-1}$ (CN stretching) bands. Through these results, the PMMA-BPEI copolymers could be distinguished. (C) of FIG. 6 shows changes in the glass transition temperature ($T_g$) of the PMMA-BPEI copolymer by differential scanning calorimetry (DSC) analysis. BPEI in a rubbery state at room temperature had $T_g$ lower than 20° C., and PMMA-NHS showed a glass transition at 87.5° C. However, the glass transition of PMMA-BPEI copolymers with different BPEI fractions was observed at 60° C. As shown in FIG. 7, when two polymers having no specific functional group, BPEI and PMMA, were physically mixed, $T_g$ was detected at 105° C. By comparing (C) of FIG. 6 and FIG. 7, it was confirmed that the two polymers, i.e., BPEI and PMMA-NHS, had a high chemical interaction and were mixed at the sub-nano scale. FIG. 8 shows a graph showing the result of TGA analysis under nitrogen ($N_2$), wherein the PMMA-BPEI copolymer exhibited a three-fold weight loss, indicating that PMMA-NHS and BPEI are combined. Therefore, the existence of PMMA and BPEI in the PMMA-BPEI copolymer was confirmed.

Example 2. Manufacture of Film Composite

Figure 9:
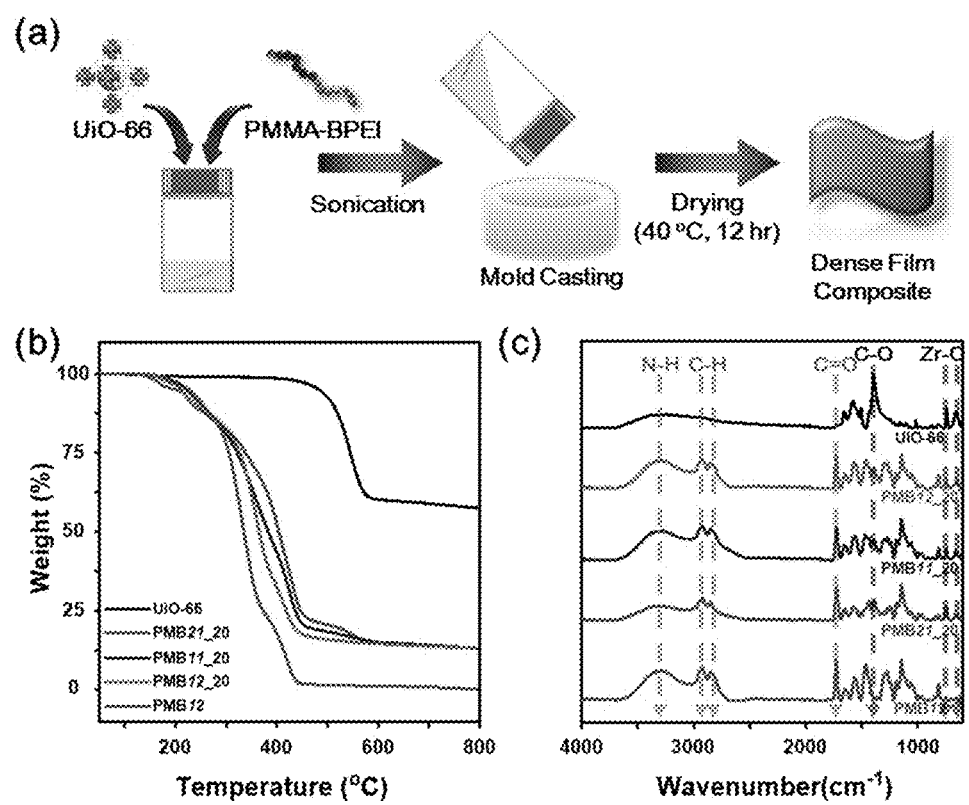
In FIG. 9, (A) shows a schematic illustration of manufacture of a film composite, (B) shows a TGA spectrum under nitrogen ($N_2$), and (C) shows an FT-IR spectrum of PMMA-BPEI/UiO-66 film composites having different BPEI fractions.

As shown in (A) of FIG. 9, after preparing the PMMA-BPEI copolymer and UiO-66 according to Example 1 and Preparation Example 1, the materials were mixed in a solution and cast on various supports including a Teflon mold or glass, silicon wafer, etc. After drying at 70° C. for 2 hours, film composites of UiO-66 and PMMA-BPEI were manufactured.

Experimental Example 3. Evaluation of Properties of PMMA-BPEI Film

Film properties of the PMMA-BPEI copolymers were evaluated. It was confirmed that a copolymer having a BPEI fraction of more than 80% was unable to form a film (Table 2). Therefore, in the present invention, a PMMA-BPEI copolymer having a BPEI fraction of 73% or more was not synthesized. The detailed properties of PMMA-BPEI copolymers with different BPEI fractions are summarized in Table 2. Based on $^1$H NMR and FT-IR spectra and thermal analysis (DSC and TGA), synthesis of PMMA-BPEI copolymers with controlled BPEI fractions was confirmed.

TABLE 2

| Experimental group | Sample | BPEI fraction$^a$ (%) | $Mn^a$ (kDa) | $T_g^b$ (° C.) | Zeta Potential$^c$ (mV) | Presence of film property |
|---|---|---|---|---|---|---|
| 1 | BPEI | 100 | 10 | — | 20.5 ± 1.3 | X |
| 2 | PMB-12 | 73.34 | 13.7 | 61.0 | 17.5 ± 0.9 | O |
| 3 | PMB-11 | 57.29 | 17.6 | 61.2 | 15.1 ± 1.3 | O |
| 4 | PMB-21 | 35.6 | 28.5 | 61.9 | 10.8 ± 1.9 | O |
| 5 | PMMA-NHS | 0 | 10 | 87.5 | −0.2 ± 1.3 | O |

(In Table 2, $^a$BPEI fraction and number average molecular weight ($M_n$) were calculated by $^1$H NMR, $^b$glass transition temperature ($T_g$) was measured by DSC, and $^c$surface zeta potential of the polymer was measured at pH 7.0. PMMA-BPEI copolymer having a molar ratio (x:y) of PMMA and BPEI was indicated by PMB-xy.)

Experimental Example 4. Evaluation of Properties of UiO-66/PMMA-BPEI Film Composite 4.1 Evaluation of Properties of Film Composites with the Same Weight Ratio of UiO-66 and Different Weight Ratios of PMMA-BPEI FIGS. 9B and 9C show the results of analyzing the film composites manufactured in Example 2 through TGA and FT-IR, and through the results, the weight ratios of UiO-66 could be identified. A composite film composed of PMB xy and z wt % of UiO-66 was represented by PMBxy_z. For example, a composite film with PMB12 and 20 wt % of UiO-66 was referred to as PMB12-20. In the TGA spectrum, the actual UiO-66 content was calculated as 20.1 wt %, 20.0 wt %, and 20.6 wt % for PMB21_20, PMB11_20, and PMB12_20, respectively.

The weight fraction of UiO-66 in the PMMA-BPEI and UiO-66 composite was calculated as follows. In the TGA spectrum, carbon and zirconium metals of UiO-66 were maintained at 800° C. In contrast, all PMMA-BPEI polymers were consumed at 800° C. under nitrogen ($N_2$). By comparing the residuals at 800° C., the UiO-66 weight fraction was calculated. The wt % of UiO-66 in PMB12_20 was calculated by the following equation:

$$W_{UiO\text{-}66 \text{ in composite}} = W_{UiO\text{-}66} * x_1 + W_{PMMA\text{-}BPEI} * (1-x_1) \quad \text{(Equation 2)}$$

Meanwhile, $W_y$ represents the residual fraction of y at 800° C. under nitrogen ($N_2$), and $x_1$ represents wt % of UiO-66 in the PMMA-BPEI/UiO-66 composite. For example, when the residual fractions of UiO-66, PMB12_20, and PMB12 at 800° C. were 57.5 wt %, 11.8 wt %, and 0.3 wt %, the UiO-66 content in PMB12_20 was calculated as 20.2 wt %.

Figure 10:
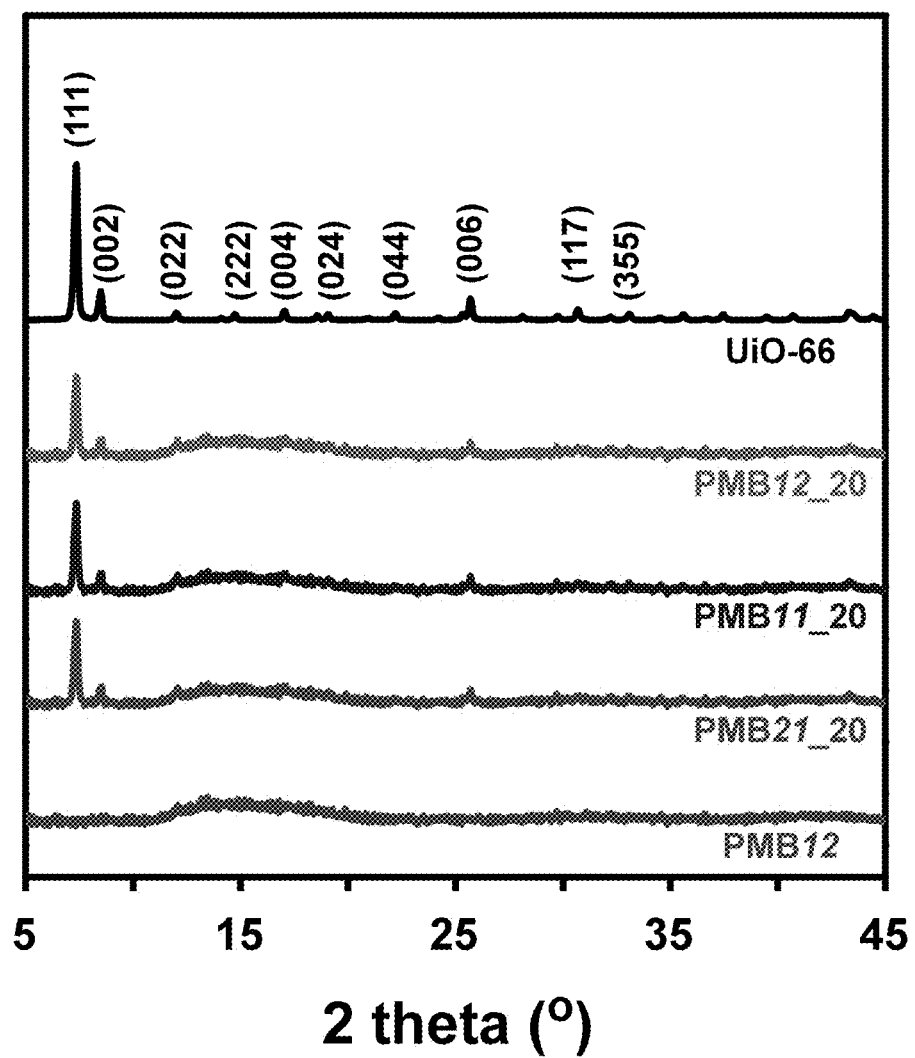
FIG. 10 shows XRD (X-ray diffraction) patterns of PMMA-BPEI/UiO-66 film composites having different BPEI fractions and UiO-66=20±0.2 wt %.

In the FT-IR spectrum of (C) of FIG. 9, it was confirmed that the respective functional groups of UiO-66 and PMMA-BPEI were also maintained in the film composite. In FIG. 10, for further analysis of the crystal structure of UiO-66, the XRD patterns were measured. In the XRD patterns, the PMMA-BPEI copolymer had one broad peak around 15°, and UiO-66 showed sharp peaks at 7°, 8.5°, and 260 derived from the (111), (002), and (006) planes. All composite films with 20 wt % UiO-66 show sharp peaks at 7°, 8.5°, and 26° as well as a broad peak at 15°, indicating that the composite films with UiO-66 and PMMA-BPEI maintained each crystal structure. Based on TGA. FT-IR, and XRD analysis, it was confirmed that the film composites were manufactured.

Figure 11:
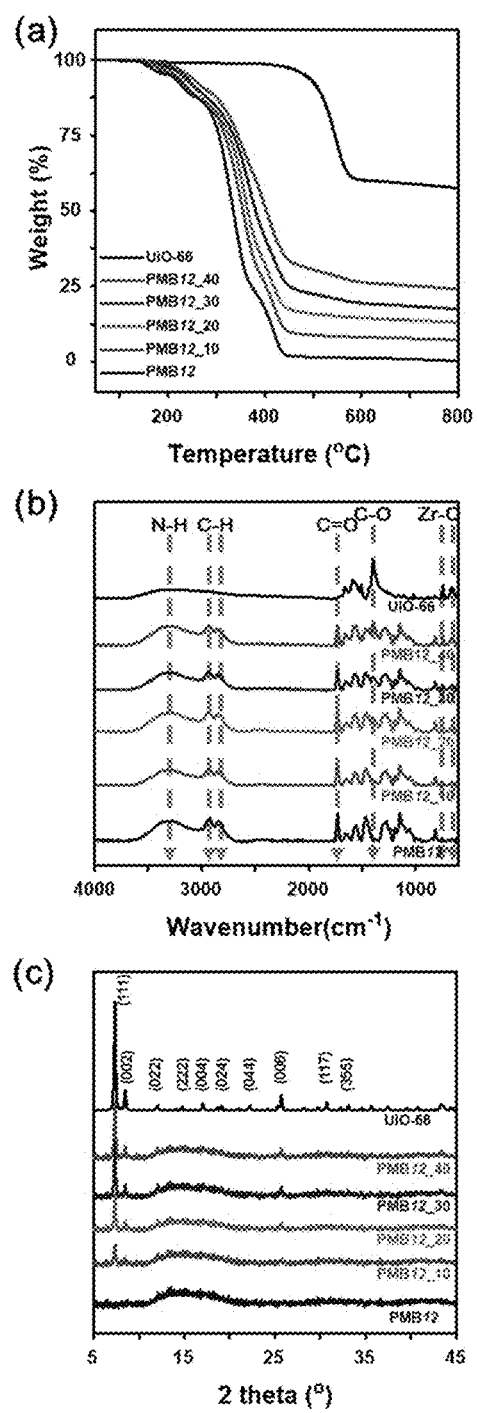
In FIG. 11. (A) shows a TGA spectrum of PMB12/UiO-66 composites having different UiO-66 contents under nitrogen ($N_2$), (B) shows an FT-IR spectrum thereof, and (C) shows XRD patterns thereof.

4.2 Evaluation of Properties of Film Composites with Different Weight Ratios of UiO-66 and the Same Weight Ratio of PMMA-BPEI As shown in FIG. 11, UiO-66 and PMMA-BPEI copolymer film composites with different weight ratios of UiO-66 were analyzed through TGA, FT-IR, and XRD. When UiO-66 was applied in an amount of about 40 wt % or more, aggregation of UiO-66 particles was detected, and properties of PMMA-BPEI films were rapidly decreased. Therefore, the UiO-66 and PMMA-BPEI copolymer composites were manufactured by using UiO-66 of up to about 40 wt %. From the TGA data, it was confirmed that the composites with a higher UiO-66 content had a relatively small weight loss at 600° C. Based on the residual amounts at 800° C., the UiO-66 contents of PMB12-40, PMB12-30, PMB12-20, and PMB12-10 were calculated as 40.4 wt %, 28.5 wt %, 20.6 wt %, and 10.2 wt %, respectively. In addition, in the FT-IR spectrum, specific peaks of UiO-66 such as 1394 $cm^{-1}$ (CO stretching), 743 $cm^{-1}$ and 658 $cm^{-1}$ (Zr—O stretching) increased according to the weight ratio of UiO-66. The XRD patterns of the manufactured composites were consistent with the accumulation of PMB12 and UiO-66. In particular, the composite films with a higher UiO-66 content showed higher and sharper peaks in the UiO-66 crystal region.

Figure 12:
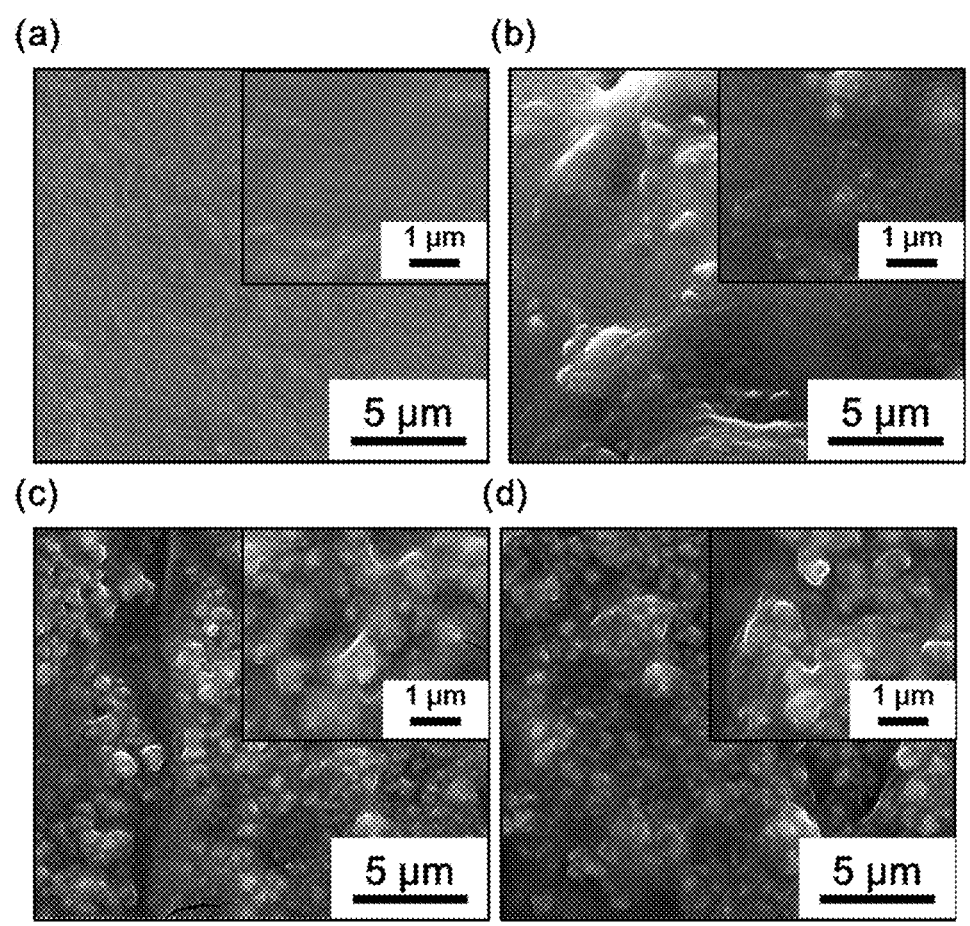
FIG. 12 shows scanning electron microscope (SEM) images of PMB12/UiO-66 film composites having different UiO-66 fractions ((a) PMB12, (b) PMB12_20, (c) PMB12_30, and (d) PMB12_40)

In the SEM analysis of FIG. 12, the surface morphology and dispersion of the UiO-66 and PMB12 composites were analyzed. The PMB12 film showed a flat surface morphology without cracking. In contrast, the UiO-66-containing composites showed a rough surface and excellent dispersion of UiO-66. As the UiO-66 content increased, the surface morphology became rough. However, in the case of PMB12_40, no cracks of any kind were detected. The TGA, FT-IR, XRD, and SEM analysis confirmed that the UiO-66 weight ratio-controlled composites were manufactured.

Figure 13:
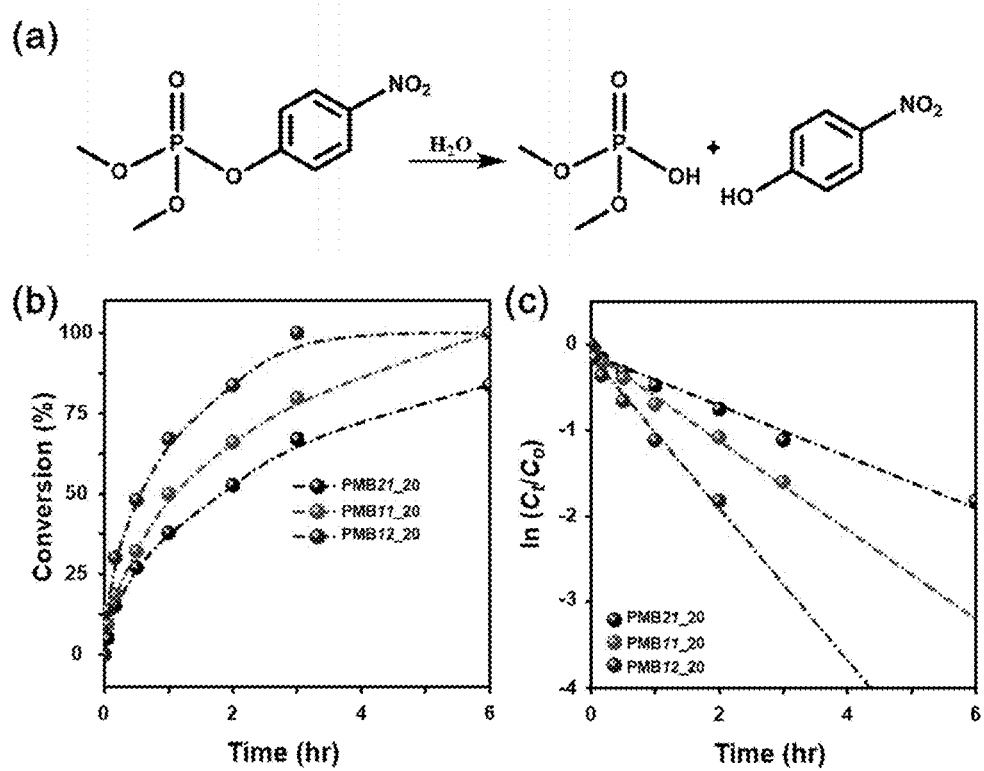
In FIG. 13, (A) shows MPO hydrolysis reactions of PMMA-BPEI/UiO-66 film composites having different BPEI fractions, and (B) and 13C show a plot of conversion vs. time and a plot of a pseudo-first-order kinetics $\ln(C_t/C_o)$ vs. time, each representing the kinetics of the MPO hydrolysis reactions.

Experimental Example 5. Evaluation of Catalytic Activities of UiO-66/PMMA-BPEI Film Composites 5.1 Evaluation of Catalytic Activities of Film Composites with the Same Weight Ratio of UiO-66 and Different Weight Ratios of PMMA-BPEI As shown in FIG. 13, after synthesis and manufacturing of the UiO-66 and PMMA-BPEI composite films, the catalytic activities of the manufactured composites were evaluated. FIG. 13A illustrates the chemical structure of methyl paraoxon (MPO), which is a nerve gas analog, and a hydrolysis reaction scheme. In the present invention, the hydrolysis activity against CWA, which is an actual agent, was estimated by using the nerve gas analog MPO. Reaction kinetics were monitored by UV-Vis spectroscopy, and cross-checked by $^{31}P$ NMR. First, an MPO hydrolysis reaction was performed using UiO-66 and PMMA-BPEI film composites with different BPEI fractions. Composites with higher BPEI content were expected to improve the MPO degradation capacity of UiO-66. FIG. 13B shows a plot of conversion vs. time for the composites with different BPEI fractions. The PMB21_20 composite showed only about 80% conversion for 6 hours, while the PMB12_20 composite showed about 100% conversion within 3 hours, indicating that the catalytic reactivity was improved as the BPEI fraction in the film composite increased. In FIG. 13C, for accurate evaluation of the reaction kinetics plot, it was converted into a plot of $\ln(C_t/C_o)$ vs. time. The plot of $\ln(C_t/C_o)$ vs. time for the manufactured PMMA-BPEI and UiO-66 composite shows excellent linearity, indicating that the MPO hydrolysis reaction was very consistent with the pseudo-first-order kinetics. The catalyst profiles including half-life ($t_{1/2}$) and kinetic coefficient (k) were calculated from the pseudo-first-order kinetic equation ($\ln(C_t/C_o)=-kt$). t represents the reaction time, $C_t$ represents the concentration of MPO at a specific time, and PMB21_20, PMB11_20, and PMB12_20 composites showed k values of 0.298 $hr^{-1}$, 0.519 $hr^{-1}$, and 0.885 $hr^{-1}$, respectively. The half-life of PMB21_20, PMB11_20, and PMB12_20 composites for the MPO hydrolysis reaction was about 2.3 hours, about 1.3 hours, and about 0.78 hours, respectively. With the above information taken together, it was found that the copolymer with the optimized content ratio was PMB12.

Figure 14:
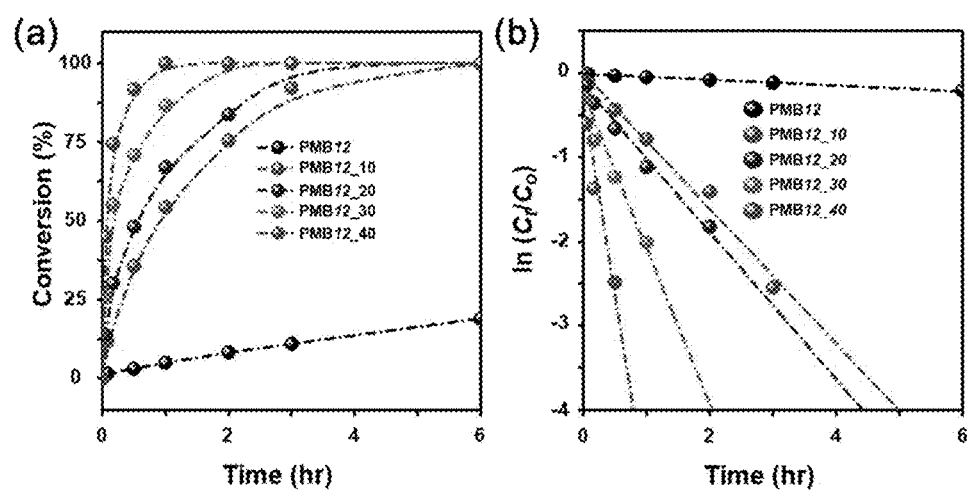
In FIGS. 14, (A) and (B) show a plot of conversion vs. time, and a plot of a pseudo-first-order kinetics $\ln(C_t/C_o)$ vs. time, each representing the kinetics of MPO hydrolysis reactions of PMB12/UiO-66 film composites having different UiO-66 weight fractions.

5.2 Evaluation of Catalytic Activities of Film Composites with Different Weight Ratios of UiO-86 and the Same Weight Ratio of PMMA-BPEI As shown in FIG. 14, after selecting PMB12 according to the optimal content ratio of PMMA-BPEI, the MPO hydrolysis reaction of the film composites with different weight ratios of UiO-66 was evaluated. PMB12 film without UiO-66 showed only 19% conversion within 6 hours, but all composite films with UiO-66 showed about 100% conversion within 6 hours regardless of the content of UiO-66. In addition, as the UiO-66 content increased, the reaction rate was improved. In particular, the PMB12_40 composite was able to reach about 100% conversion within 1 hour. The k value and half-life ($t_{1/2}$) were evaluated via the plot of $\ln(C_t/C_o)$ vs. time. The plot of $\ln(C_t/C_o)$ vs. time was very consistent with the pseudo-first-order reaction as in Experimental Example 5.1. The k values of PMB12, PMB12-10, PMB12-20, PMB12-30, and PMB12-40 were 0.034 $hr^{-1}$, 0.802 $hr^{-1}$, 0.885 $hr^{-1}$, 1.848 $hr^{-1}$, and 4.7 $hr^{-1}$, respectively. As a result, it was found that as the UiO-66 content increases, the k value of PMB12 and UiO-66 composite tends to improve.

Table 3 summarizes the MOF contents and catalyst profiles of the composites for hydrolysis of CWA, processed with different solutions from the present invention.

TABLE 3

| Experimental group | Sample | MOF content (wt %) | Condition | $t_{1/2}^a$ (hr) | $k^a$ ($hr^{-1}$) |
| --- | --- | --- | --- | --- | --- |
| 1 | PMB12 | 0 | Neutral | 20.3 | 0.034 |
| 2 | PMB12_10 | 10.2 | Neutral | 0.86 | 0.802 |
| 3 | PMB12_20 | 20.6 | Neutral | 0.78 | 0.885 |
| 4 | PMB12_30 | 28.5 | Neutral | 0.37 | 1.848 |
| 5 | PMB12_40 | 40.4 | Neutral | 0.14 | 4.710 |
| 6 | UiO-66/DSPD | 49.5 | N-EM 0.45M | 3.61 | 0.192 |

TABLE 3-continued

| Experimental group | Sample | MOF content (wt %) | Condition | $t_{1/2}{}^a$ (hr) | $k^a$ $(hr^{-1})$ |
|---|---|---|---|---|---|
| 7 | UiO-66-NH$_2$/SEBS | 20 | — | Inactive | Inactive |
| 8 | HKUST-1/SIS | 50 | — | Inactive | Inactive |

(In Table 3, $^a$half-life ($t_{1/2}$) and kinetic coefficient k value were calculated by a pseudo-first-order kinetic equation.)

As shown in Table 3, the UiO-66/DSPD composite including 49.5 wt % UiO-66 exhibited a k value of 0.19 even when performed in 0.45 M of N-EM buffer solution. Further, the UiO-66-NH$_2$/SEBS and HKUST-1/SIS composites showed no hydrolysis activity even when MOF was included. Accordingly, the present invention confirmed that the PMMA-BPEI copolymer and UiO-66 composite are the first materials to have solution processability and have significance in completing a material with improved hydrolysis activity against CWA.

Figure 15:
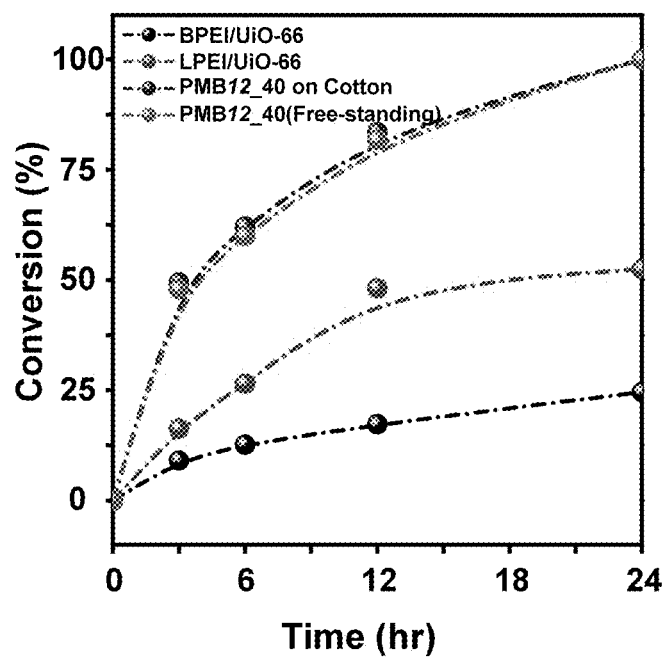
FIG. 15 shows a plot of conversion vs. time representing the kinetics of MPO hydrolysis reactions of LPEI/UiO-66, BPEI/UiO-66, and PMB12_40 at 25° C. and a relative humidity of 99%.

5.3 Comparative Evaluation of MPO Degradation Ability and Processability of UiO-66/PMMA-BPEI As shown in FIG. 15, the PMB12_40 composite selected as the optimized composite in Experimental Example 5 was applied to the gas-phase CWA detoxification, and its applicability and processability to an actual chemical-protective fabric were evaluated. In addition, gas-phase MPO hydrolysis was evaluated, based on LPEI/UiO-66 and BPEI/UiO-66 composites with 40 wt % UiO-66. Since the existing LPEI and BPEI have insufficient processability, LPEI/UiO-66 and BPEI/UiO-66 composites were manufactured on cotton fabrics. The gas-phase reaction was carried out at room temperature (25° C.±0.2° C.) and a relative humidity (RH) of 99%. BPEI/UiO-66 and LPEI/UiO-66 showed a conversion rate of about 23.5% and about 63.7%, respectively, whereas PMB12_40 showed a conversion rate of about 100% in 24 hours. In addition, BPEI and LPEI are insufficient in terms of processability, but PMB12_40 could be processed into a film despite the UiO-66 content of 40 wt %. These results confirmed that the UiO-66/PMMA-BPEI film composite has excellent applicability to chemical protection fabrics, based on excellent processability and excellent gas-phase activity for MPO hydrolysis.

The invention claimed is:

1. A catalyst composition comprising a copolymer of a first polymer and a second polymer;
   wherein the first polymer includes an alkyl (meth)acrylate polymer, and the alkyl is any one selected from the group consisting of methyl, ethyl, and propyl, and the second polymer is a branched polyethylenimine (BPEI) or linear polyethylenimine (LPEI), and
   a zirconium (Zr) metal-organic framework selected from the group consisting of UiO-66, UiO-67, PCN-545, and NU-1000,
   wherein the metal-organic framework has chemical warfare agent (CWA) degradation ability that includes liquid- or gas-phase detoxification, and
   the copolymer is formed by a coupling reaction of the first and the second polymers.

2. The catalyst composition of claim 1, wherein a molar ratio of the first polymer to the second polymer in the copolymer is from 1:0.5 to 1:2.

3. The catalyst composition of claim 1, wherein a molecular weight of the copolymer is 13,000 to 30,000.

4. The catalyst composition of claim 1, wherein the metal-organic framework is 0.01 wt % to 40 wt % with respect to the total weight of the catalyst composition.

5. The catalyst composition of claim 1, wherein the half-life for a hydrolysis reaction of the chemical warfare agent (CWA) is 0.7 hours to 2.5 hours.

6. The catalyst composition of claim 1, wherein the copolymer including the first polymer and the second polymer exhibits peaks at about 1720 cm$^{-1}$, about 1650 cm$^{-1}$, and about 1565 cm$^{-1}$, in an X-ray photoelectron spectrum.

7. A film composite manufactured by casting the catalyst composition of claim 1.

8. The film composite of claim 7, wherein the thickness of the film composite is 20 μm to 500 μm.

9. The film composite of claim 7, further comprising one or more supports selected from the group consisting of a metal substrate, ceramic plate, glass plate, silica substrate, clay products, a cotton fabric, a polymer film, and a porous resin.

10. A method of preparing a catalyst composition according to claim 1, the method comprising:
    a first step of coupling 2-(dodecylthiocarbonothioylthio)-2-methylpropionic acid (CTA) and N-hydroxysuccinimide (NHS) to synthesize a chain transfer agent;
    a second step of functionalizing the first polymer with the chain transfer agent;
    a third step of performing an amide or ester coupling reaction of the second polymer and the functionalized first polymer prepared in the second step to synthesize a copolymer; and
    a fourth step of mixing the prepared copolymer and a metal-organic framework,
    wherein the
    first polymer includes is an alkyl (meth)acrylate polymer, and the alkyl is selected from the group consisting of methyl, ethyl, and propyl, and the second polymer is a branched polyethylenimine (BPEI) or linear polyethylenimine (LPEI), and
    the metal-organic framework is a zirconium (Zr) metal-organic framework selected from the group consisting of UiO-66, UiO-67, PCN-545, and NU-1000.

11. The method of claim 10, wherein the second step is to functionalize by a reversible addition fragmentation chain transfer (RAFT) reaction.

12. A method of manufacturing a film composite, the method comprising:
    a first step of preparing a mixture by sonication of the catalyst composition of claim 1;
    a second step of injecting the mixture into a mold for casting; and
    a third step of drying at 30° C. to 50° C. for 12 hours.

13. The method of claim 12, further comprising one or more coating steps selected from the group consisting of spray coating, dip coating, spin coating, and blade coating, after the third step.

* * * * *